United States Patent
Butera et al.

(10) Patent No.: US 6,871,519 B2
(45) Date of Patent: Mar. 29, 2005

(54) LOCK FOR DOORS

(75) Inventors: Francesco Butera, Orbassano (IT); Stefano Alacqua, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/102,655

(22) Filed: Mar. 22, 2002

(65) Prior Publication Data

US 2002/0139157 A1 Oct. 3, 2002

(30) Foreign Application Priority Data

Mar. 23, 2001 (EP) ............................................. 01830211

(51) Int. Cl.⁷ .......................... B60R 25/00; E05B 65/12
(52) U.S. Cl. .................. 70/256; 70/DIG. 10; 70/279.1; 292/DIG. 66; 292/DIG. 25
(58) Field of Search ........................... 70/256, DIG. 10, 70/279.1; 292/DIG. 66, DIG. 4, DIG. 14, DIG. 25, DIG. 43

(56) References Cited

U.S. PATENT DOCUMENTS

| | | | | |
|---|---|---|---|---|
| 3,062,033 A | * | 11/1962 | Schmalfeldt | 70/256 |
| 4,753,465 A | * | 6/1988 | Dalby | 292/32 |
| 5,057,674 A | * | 10/1991 | Smith-Johannsen | 219/553 |
| 5,071,064 A | * | 12/1991 | AbuJudom et al. | 236/1 G |
| 5,095,595 A | * | 3/1992 | Stella et al. | 24/603 |
| 5,176,544 A | * | 1/1993 | AbuJudom et al. | 439/878 |
| 5,551,187 A | * | 9/1996 | Brouwer et al. | 49/1 |
| 5,618,066 A | * | 4/1997 | Fu-Hsiang | 292/62 |
| 5,831,417 A | * | 11/1998 | Chu | 322/1 |
| 5,868,013 A | * | 2/1999 | Julien | 70/38 A |
| 6,008,992 A | * | 12/1999 | Kawakami | 361/726 |
| 6,098,490 A | * | 8/2000 | Kowalewski et al. | 74/506 |
| 6,276,202 B1 | * | 8/2001 | Latarius | 73/335.05 |
| 6,310,332 B1 | * | 10/2001 | Gerrard | 219/505 |
| 6,485,081 B1 | * | 11/2002 | Bingle et al. | 296/76 |
| 6,508,437 B1 | * | 1/2003 | Davis et al. | 244/158 R |
| 6,511,508 B1 | * | 1/2003 | Shahinpoor et al. | 623/4.1 |

* cited by examiner

Primary Examiner—John B. Walsh
(74) Attorney, Agent, or Firm—Sughrue Mion, PLLC

(57) ABSTRACT

A lock for doors, for example doors of homes, offices, hotel rooms or similar, as well as doors of motor vehicles, includes a lock opening control assembly having a control device located at a distance from the lock and a mechanical transmission connecting the control device to the lock. A shape memory actuator is arranged in between the mechanical transmission, so that the lock can be opened both by operating the shape memory actuator, and by operating the control device, in which case the shape memory actuator works simply as a mechanical transmission element.

8 Claims, 3 Drawing Sheets

LOCK FOR DOORS

BACKGROUND OF THE INVENTION

This invention relates to locks for doors, for example doors of homes, offices, hotel rooms or similar, as well as doors of motor vehicles.

Over the past years, electrically operated locks have been increasingly common, for example for hotel room doors. A similar diffusion of electrically operated locks is foreseen for the future for the doors of motor vehicles. Also in the case when an electrically operated lock is used, for reasons of safety, a mechanical device for opening the door from the inside must be provided. This is also the case of a door, a rear tailgate or rear lid of a motor vehicle, where required, to allow the occupant to exit by means of a mechanical action only.

SUMMARY OF THE INVENTION

The purpose of this invention is to make a lock of the type described above which incorporates in a particularly simple and efficient way both the electrical operating means and the internal mechanical release means.

In order to attain this purpose, this invention relates to a lock for doors, for example doors of homes, offices, hotel rooms or similar, as well as the doors of motor vehicles, comprising control means for opening the lock, characterised in that said control means include a shape memory actuator. More specifically, according to this invention, the control means of the lock include a control device located at a distance from the lock and a mechanical transmission, which connects the control device to the lock, said shape memory actuator being arranged in between said mechanical transmission, externally with respect to the lock, in such as way that the lock can be opened both by operating the shape memory actuator, both by acting on said control device, in which case the shape memory actuator acts simply as a mechanical device belonging to said transmission.

The use of actuating means made of shape memory metallic alloys, typically nickel and titanium, has been known for some time. Such elements deform when a predetermined transition temperature is reached, for example in the order of 100° C.

In the preferred form of embodiment of this invention, said shape memory actuator comprises a shape memory metal wire, arranged in between said mechanical transmission, and means for supplying electrical current through the wire, thus heating it and causing it to contract.

Thanks to said characteristics, as mentioned, the lock can be opened both electrically, causing electrical current to cross the shape memory wire, and mechanically, by acting on the remote control device, in which case the shape memory wire is simply a mechanical transmission device.

Said electrical power means comprise a control unit for causing the passage of current through the shape memory wire following the operation of a control device, for example a device which can be operated by means of a mechanical or electronic key.

Also in the case of the preferred form of embodiment of this invention, the electrical power means include a PTC component for cutting off the passage of current through the wire when a predetermined temperature is reached. Thanks to this characteristic, the control generated by said control unit causes the shape memory wire to warm up, after which the system automatically cuts off the passage of current through the wire.

Again in a practical form of embodiment, the shape memory wire can be surrounded by an isolating sheath. Both extremities of this sheath may be connected to adjacent elements of said mechanical transmission, by which it contributes to transmitting the force when the lock is opened mechanically by operating the control device.

A specific example of application of this invention refers to the case of a tailgate or rear lid of a motor vehicle, in which case the control device consists of, for example, an operating lever arranged near the driver's seat, and the shape memory wire is arranged in between the mechanical connection between said operating lever and the lock on the tailgate or rear lid. In alternative application, the control device is a safety wire arranged inside the tailgate for letting out occupants.

Another possible application is that of a side door of a motor vehicle, in which case the control device consists of a handle for opening the door from the inside, while the control unit is controlled by the lock provided for opening the door from the outside.

BRIEF DESCRIPTION OF THE DRAWINGS

This invention will be better explained by the following detailed descriptions with reference to the accompanying figure as non-limiting example, whereas.

DETAILED DESCRIPTION OF THE INVENTION

Figure 1:
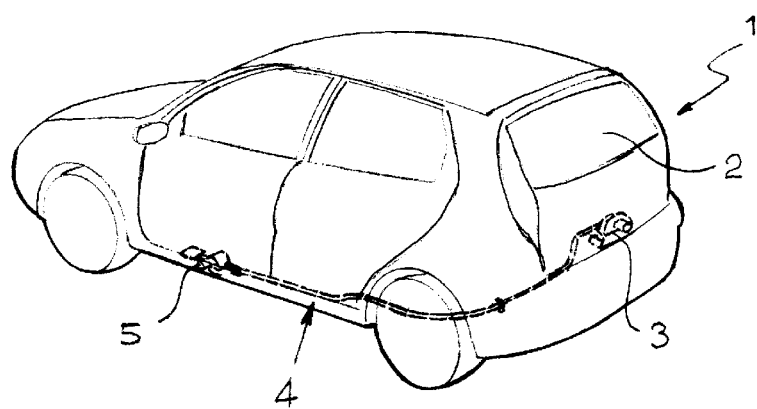
FIG. 1 is a prospective schematic view illustrating a first form of embodiment of the lock according to this invention, applied to a tailgate of a motor vehicle.
Figure 2:
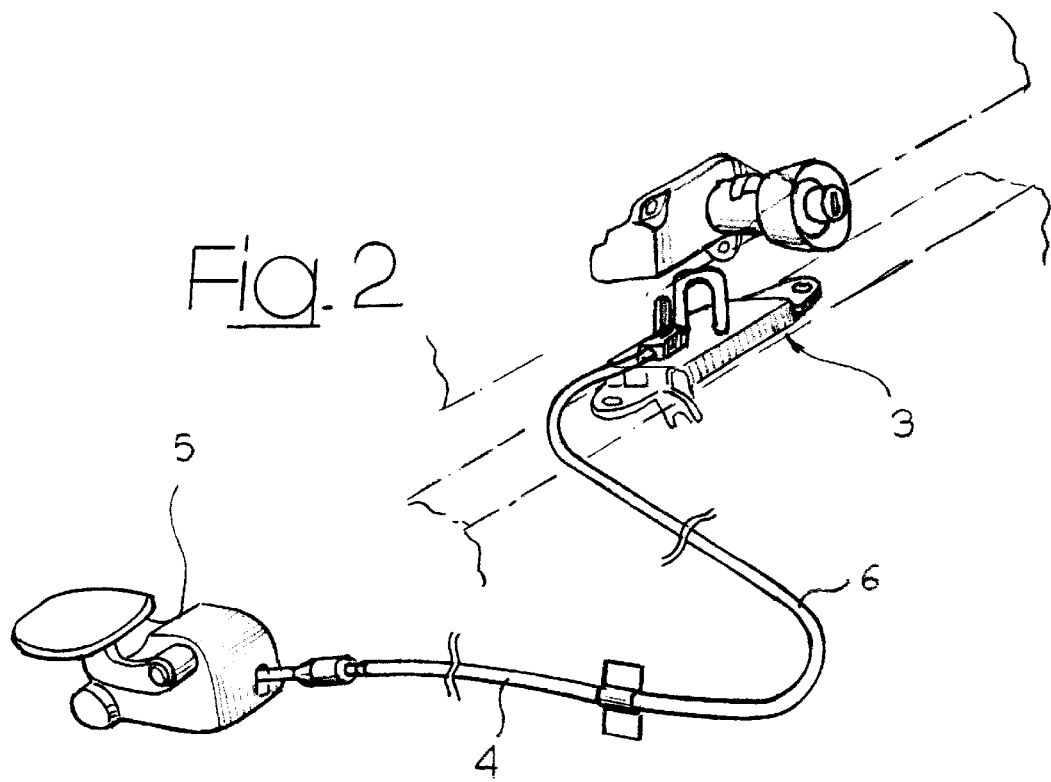
FIG. 2 is an extended scaled view of the lock arrangement and respective control in FIG. 1.

With reference to FIGS. 1, 2, numeral 1 indicates a motor vehicle with a tailgate 2 fitting a lock 3. The lock 3 can be operated either electrically or by means of a mechanical transmission 4, consisting of a flexible wire, which leads to an operating lever 5 arranged near the driver's seat. The electrical operation of the lock is permitted by a shape memory wire 6 (FIG. 2) which is connected in series between the flexible steel wire 4 and the mechanism of the lock 3.

The lock can be controlled electrically from the outside, causing the passage of current through the shape memory wire 6. This result can be obtained by means of a control device arranged outside the tailgate, consisting of a lock which can be operated by means of a key, which supplies current to the shape memory wire 6. Naturally, the key may be electronic or replaced, for example, by an infrared or ultrasound remote control device.

At the same time, the lock according to this invention can be opened from the inside by acting on the mechanical transmission 4 by means of the operating lever 5. In this case, the shape memory wire acts simply as a mechanical transmission device, transmitting the attraction impressed on the wire 4 to the controlled device inside the lock 3.

Figure 3:
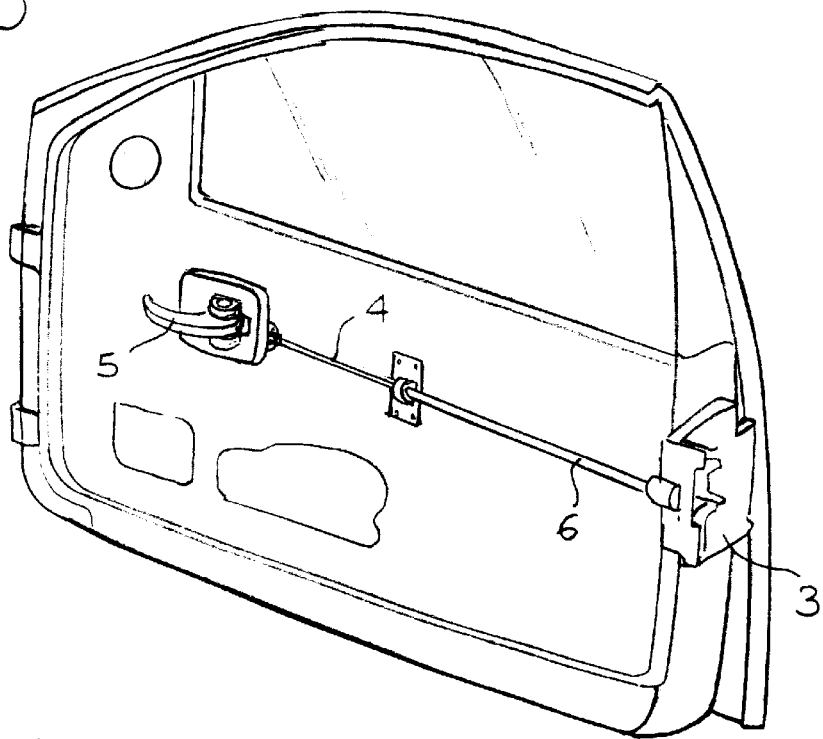
FIG. 3 illustrates a second form of embodiment of this invention applied to the side door of a motor vehicle.
Figure 4:
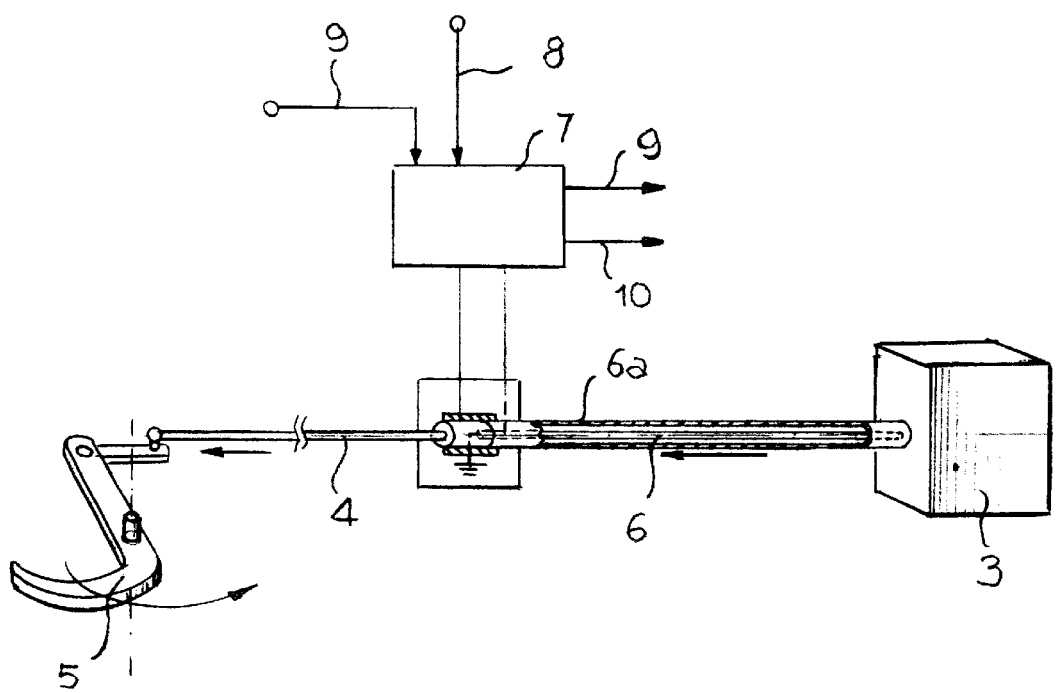
FIG. 4 is an extended schematic view of the arrangement in FIG. 3 and FIGS. 5, 6 illustrate a variant of FIGS. 1, 2.

FIG. 3 refers to a second form of embodiment applied to a side door of a motor vehicle. The lock 3 is fitted on the door and is destined to co-operate with a striker fitted on the chassis of the motor vehicle. The lock 3 can be opened mechanically from the inside, by means of the control lever 5, connected to the mechanism of the lock 3 by a mechanical transmission consisting of a rod 4, arranged in series with a shape memory wire 6. As can be seen in FIG. 4, the rod 4 is connected both to the wire 6 and to a isolating sheath 6a surrounding said wire. On the opposite extremity, the shape memory wire 6 is connected to the device controlled by the lock. Furthermore, it is electrically connected to the battery of the motor vehicle by means of a PTC component, for cutting off the passage of current when a predetermined temperature is reached.

The electrical power through the shape memory wire is controlled by an electronic control unit 7 which is operated following a signal 8 generated by introducing a key, electronic card, or any other control device (for example, a digital recognition device). The control unit 7 is also activated by a signal 9 generated by operating the handle on the outside of the door. Furthermore, a signal 9 and a signal 10 are sent by the control unit 7 to the dashboard instrument panel of the motor vehicle, respectively, for signalling the open or closed condition of the door and for signalling locked condition of the lock.

Whenever a key is introduced in the lock on the outside of the door and the external handle of the door is operated, the shape memory wire 6 is rapidly heated following the passage of current. This passage is cut off by the PTC component when a predetermined temperature is reached. During this operating phase, the rod 4 is stopped and the shape memory wire 6 contracts, causing the lock 3 to open.

Conversely, the lock 3 can be opened at any time by means of the mechanical transmission 4, in which case the shape memory wire 6 acts solely as a mechanical transmission device by operating the internal lever 5.

Figure 5:
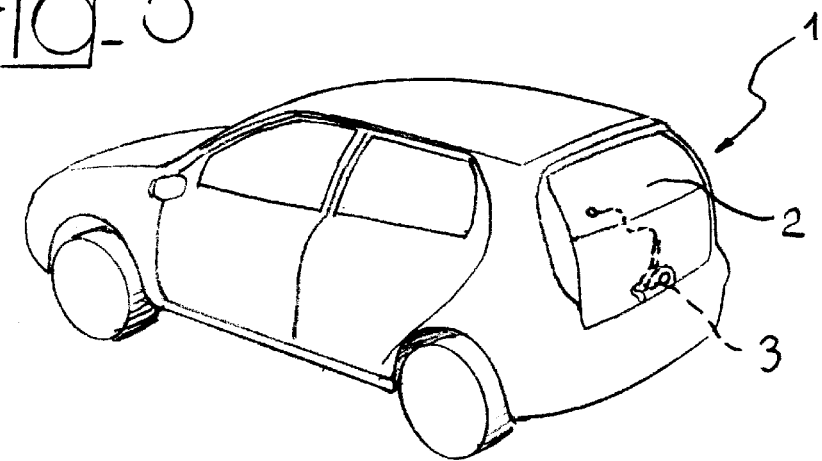
Figure 6:
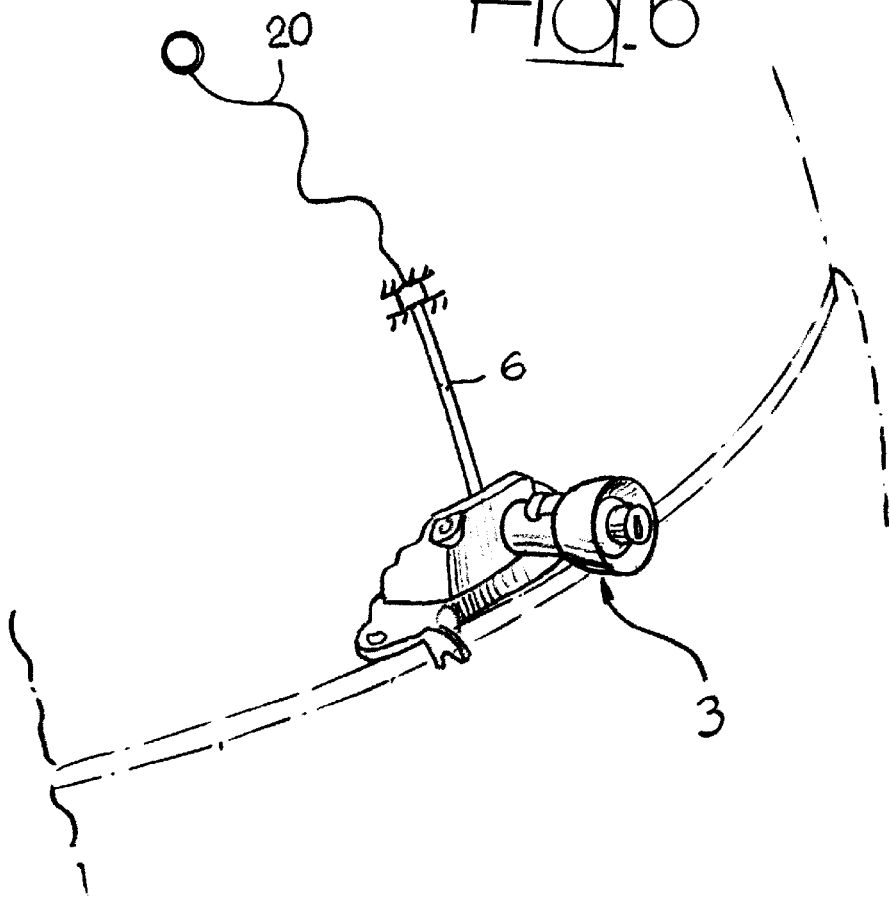

FIGS. 5, 6 illustrate a variant of FIGS. 1, 2. In this case, a safety wire 20 for mechanically opening the door from the inside is provided inside the tailgate 2 for letting out the occupants locked inside. Also in this case, the wire 20 is connected in series to a shape memory actuator 6.

Naturally, numerous changes can be implemented to the construction and forms of embodiment of the invention herein envisaged, all comprised within the context of the concept characterising this invention.

What is claimed is:

1. A lock for a door comprising lock opening control means comprising a mechanical control device located at a distance from the lock and a mechanical transmission connecting the mechanical control device to the lock, said mechanical transmission including a mechanical element connected to said mechanical control device and a shape memory actuator connected to said mechanical element and said lock so that said lock can be opened both by operating said mechanical control device wherein the shape memory actuator works as a mechanical element in said mechanical transmission and by operating the shape memory actuator alone, wherein said shape memory actuator comprises a shape memory wire and means for supplying electrical current through the wire so as to heat the shape memory wire and make said wire contract to open said lock.

2. A lock according to claim 1 wherein said means for supplying electrical current comprises an electronic control unit for causing the passage of current through the shape memory wire upon receiving a signal from an electrical control device which can be operated by means of a mechanical key or an electronic key.

3. A lock according to claim 2 wherein said means for supplying electrical current further comprises a PTC control for cutting off the passage of current through the shape memory wire when a predetermined temperature is reached.

4. A lock according to claim 1 wherein the wire is surrounded by an isolating sheath.

5. A lock according to claim 4 wherein opposite extremities of the isolating sheath are connected to said mechanical element of said mechanical transmission and said lock by which the sheath contributes to transmitting a force when the lock is mechanically operated by means of said mechanical control device.

6. A lock according to claim 1 wherein an electrical control device is associated to the tail gate or rear lid of a motor vehicle, said control device being adapted to be arranged near the driver seat and said mechanical element of said transmission comprises a flexible wire connected in series to the shape memory wire.

7. A lock according to claim 2 wherein said control device is associated to a side door of a motor vehicle, said control device comprising a handle for opening the door from the inside of the motor vehicle, said electronic control unit being activated by means of said electrical control device comprised of a lock on the outside of the door.

8. A lock according to claim 2 wherein said electrical control device is associated to the tailgate or rear lid of a motor vehicle, said electrical control device comprising a control wire arranged inside the tailgate or rear lid and connected in series to a shape memory actuator.

* * * * *

UNITED STATES PATENT AND TRADEMARK OFFICE
CERTIFICATE OF CORRECTION

PATENT NO. : 6,871,519 B2
DATED : March 29, 2005
INVENTOR(S) : Francesco Butera and Stefano Alacqua It is certified that error appears in the above-identified patent and that said Letters Patent is hereby corrected as shown below:

Title page,
Item [30], Foreign Application Priority Data, please correct the priority date to read as follows:
-- March 27, 2001 --.

Signed and Sealed this

Sixteenth Day of August, 2005

JON W. DUDAS
*Director of the United States Patent and Trademark Office*